United States Patent
Jeong et al.

(10) Patent No.: US 9,403,531 B2
(45) Date of Patent: Aug. 2, 2016

(54) SYSTEM AND METHOD OF CONTROLLING VEHICLE USING TURNING DEGREE

(71) Applicants: Hyundai Motor Company, Seoul (KR); Kia Motors Corporation, Seoul (KR)

(72) Inventors: Donghoon Jeong, Gyeonggi-do (KR); Byeongwook Jeon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/561,570

(22) Filed: Dec. 5, 2014

(65) Prior Publication Data

US 2016/0046286 A1 Feb. 18, 2016

(30) Foreign Application Priority Data

Aug. 13, 2014 (KR) .................. 10-2014-0105027

(51) Int. Cl.
*B60W 30/045* (2012.01)
*B60W 40/09* (2012.01)
*B60W 50/00* (2006.01)

(52) U.S. Cl.
CPC ............. *B60W 30/045* (2013.01); *B60W 40/09* (2013.01); *B60W 50/0098* (2013.01); *B60W 2050/0083* (2013.01); *B60W 2520/10* (2013.01); *B60W 2520/125* (2013.01); *B60W 2520/28* (2013.01); *B60W 2540/10* (2013.01); *B60W 2540/18* (2013.01); *B60W 2540/30* (2013.01); *B60W 2550/142* (2013.01)

(58) Field of Classification Search
CPC . B60W 30/045; B60W 30/182; B60W 40/09; B60W 2540/10; B60W 2540/30; B60W 2520/10; B60W 2520/125; B60W 2520/28; B60W 2550/142
See application file for complete search history.

(56) References Cited

U.S. PATENT DOCUMENTS

| | | | | |
|---|---|---|---|---|
| 4,604,611 A | * | 8/1986 | Seko | ..................... B60K 28/066 180/272 |
| 5,152,192 A | | 10/1992 | Koenig et al. | |
| 5,410,477 A | * | 4/1995 | Ishii | ..................... B60K 41/282 701/102 |
| 7,809,487 B2 | * | 10/2010 | Syed | ..................... B60T 8/174 701/70 |
| 8,280,601 B2 | * | 10/2012 | Huang | ..................... B60W 30/12 701/1 |
| 2005/0131597 A1 | * | 6/2005 | Raz | ..................... G09B 19/167 701/29.1 |
| 2009/0099727 A1 | * | 4/2009 | Ghoneim | ............. B60W 40/08 701/36 |
| 2012/0136506 A1 | * | 5/2012 | Takeuchi | ............. B60G 17/016 701/1 |

FOREIGN PATENT DOCUMENTS

| | | |
|---|---|---|
| JP | 2008-018872 A | 1/2008 |
| JP | 2009-229098 | * 10/2009 |
| JP | 2010-208522 A | 9/2010 |
| KR | 10-0251918 B1 | 4/2000 |
| KR | 10-0295851 B1 | 5/2001 |

(Continued)

*Primary Examiner* — Michael J Zanelli
(74) *Attorney, Agent, or Firm* — Mintz Levin Cohn Ferris Glovsky and Popeo, P.C.; Peter F. Corless

(57) ABSTRACT

A system and a method of controlling a vehicle using a turning degree are disclosed. The method includes detecting input variables including a driving input variable and a turning input variable and calculating a driving tendency index based on the driving input variable. A turning degree related to the number of consecutive turnings is calculated based on the turning input variable and then the vehicle is operated based on the driving tendency index and the turning degree.

16 Claims, 4 Drawing Sheets

(56) References Cited

FOREIGN PATENT DOCUMENTS

| KR | 10-1194804 B1 | 10/2012 |
| KR | 10-2013-0062039 A | 6/2013 |
| KR | 10-2013-0065501 A | 6/2013 |
| KR | 10-2013-0067380 A | 6/2013 |
| KR | 10-2013-0114692 A | 10/2013 |
| KR | 10-2014-0114948 A | 9/2014 |
| KR | 10-2014-0141787 A | 12/2014 |
| KR | 10-2014-0143876 A | 12/2014 |
| KR | 10-2014-0143877 A | 12/2014 |
| KR | 10-2014-0145267 A | 12/2014 |
| KR | 10-2015-0034899 A | 4/2015 |

\* cited by examiner

SYSTEM AND METHOD OF CONTROLLING VEHICLE USING TURNING DEGREE

CROSS-REFERENCE TO RELATED APPLICATION

This application claims priority to and the benefit of Korean Patent Application No. 10-2014-0105027 filed in the Korean Intellectual Property Office on Aug. 13, 2014, the entire contents of which are incorporated herein by reference.

BACKGROUND (a) Field of the Invention

The present invention relates to a system and a method of controlling a vehicle using a turning degree. More particularly, the present invention relates to a system and a method of controlling a vehicle using a turning degree that improves stability and customer satisfaction by operating the vehicle using driving tendency and turning tendency of a driver.

(b) Description of the Related Art

Customer satisfaction related to driving performance of a vehicle depends on how precisely the vehicle runs based on a tendency of the customer. While tendencies of the customers vary, however, performance characteristic of the vehicle is set to one performance characteristic for the same vehicle model. Therefore, reaction of the vehicle may not coincide with the tendency of each customer. In other words, when the driving tendency of the customer is determined and a shift of the vehicle is controlled to coincide with the tendency of the customer, the customer satisfaction related to the driving performance may be maximized Therefore, many methods of learning the driving tendency of the customer for a substantial amount of time and controlling the shift based on the learned driving tendency have been developed. The method of controlling the shift based on the learned driving tendency is performed under the assumption that the driving tendency of the customer is constant. The driving tendency of the driver, however, is not constant and changes according to temporary changes of driver feelings or driving will, road condition, and so on. Therefore, the learned driving tendency may differ greatly from an actual driving tendency of the driver at one point. Thus, actual will of the driver may not be reflected on the shift and the driver may be unsatisfied with shift performance when the shift is controlled based on the learned driving tendency.

Even when drivers have the same driving tendency, however, the drivers may have different turning tendency when driving on a curved road. For example, a sporty driver may execute turning mildly on a curved road. Therefore, the shift should be controlled considering turning tendency as well as driving tendency. In addition, when the vehicle turns, a suspension system and a steering system as well as a transmission and an engine should be controlled.

The above information disclosed in this section is merely for enhancement of understanding of the background of the invention and therefore it may contain information that does not form the prior art that is already known in this country to a person of ordinary skill in the art.

SUMMARY

The present invention provides a system and a method of controlling a vehicle using a turning degree having advantages of improving stability and customer satisfaction by operating a transmission, an engine, a suspension system and a steering system using driving tendency and turning tendency of a driver.

A method of controlling a vehicle according to an exemplary embodiment of the present invention may include: detecting input variables including a driving input variable and a turning input variable; calculating a driving tendency index based on the driving input variable; calculating a turning degree related to the number of consecutive turnings based on the turning input variable; and operating the vehicle based on the driving tendency index and the turning degree.

The driving input variable may include a position of an accelerator pedal, a change rate of the position of the accelerator pedal (e.g., a change of accelerator pedal engagement), a vehicle speed, and a gradient of a road. The turning input variable may include a difference between a left wheel speed and a right wheel speed and a lateral acceleration. The operating of the vehicle may include operating at least one of an engine, a transmission, a suspension system, and steering system.

The number of consecutive turnings may be defined as the number of turning manipulations occurring consecutively during a predetermined time. Occurrence of the turning manipulation may be determined when a difference between a left wheel speed and a right wheel speed is greater than a predetermined value and an absolute value of a lateral acceleration is greater than a turning determination acceleration. The turning degree may be a maximum value of the turning degrees in which the number of consecutive turnings is greater than or equal to a threshold number set at each turning degree. The operating of the vehicle may be performed based on the driving tendency index when the driving tendency index is less than or equal to a predetermined index, and based on the driving tendency index and the turning degree when the driving tendency index is greater than the predetermined index.

A system of operating a vehicle according to another exemplary embodiment of the present invention may include: an accelerator pedal position sensor configured to detect a position of an accelerator pedal; a vehicle speed sensor configured to detect a vehicle speed; a navigation device configured to supply road information including a gradient of a road; wheel speed sensors mounted at wheels of the vehicle and detect speed of each wheel; an acceleration sensor configured to detect an acceleration of the vehicle including a lateral acceleration; and a controller configured to receive input variables including a driving input variable and a turning input variable from the accelerator pedal position sensor, the vehicle speed sensor, the navigation device, the wheel speed sensor and acceleration sensor, calculate a driving tendency index based on the driving input variable, calculate a turning degree related to the number of consecutive turnings based on the turning input variable, and operate the vehicle based on the driving tendency index and the turning degree.

The driving input variable may include a position of an accelerator pedal, a change rate of the position of the accelerator pedal, a vehicle speed, and the gradient of the road. The turning input variable may include a difference between a left wheel speed and a right wheel speed and the lateral acceleration. The controller may be configured to operate at least one of an engine, a transmission, a suspension system and a steering system. The number of consecutive turnings may be defined as the number of turning manipulations occurring consecutively during a predetermined time.

Occurrence of the turning manipulation may be determined when a difference between a left wheel speed and a right wheel speed is greater than a predetermined value and an absolute value of a lateral acceleration is greater than a turning determination acceleration. The turning degree may be a maximum value of the turning degrees in which the number of consecutive turnings is greater than or equal to a threshold number set at each turning degree. The controller may be configured to operate the vehicle based on the driving tendency index when the driving tendency index is less than or equal to a predetermined index, and based on the driving tendency index and the turning degree when the driving tendency index is greater than the predetermined index.

BRIEF DESCRIPTION OF THE DRAWINGS

These and/or other aspects of the invention will become apparent and more readily appreciated from the following description of the exemplary embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will hereinafter be described in detail with reference to the accompanying drawings.

Figure 1:
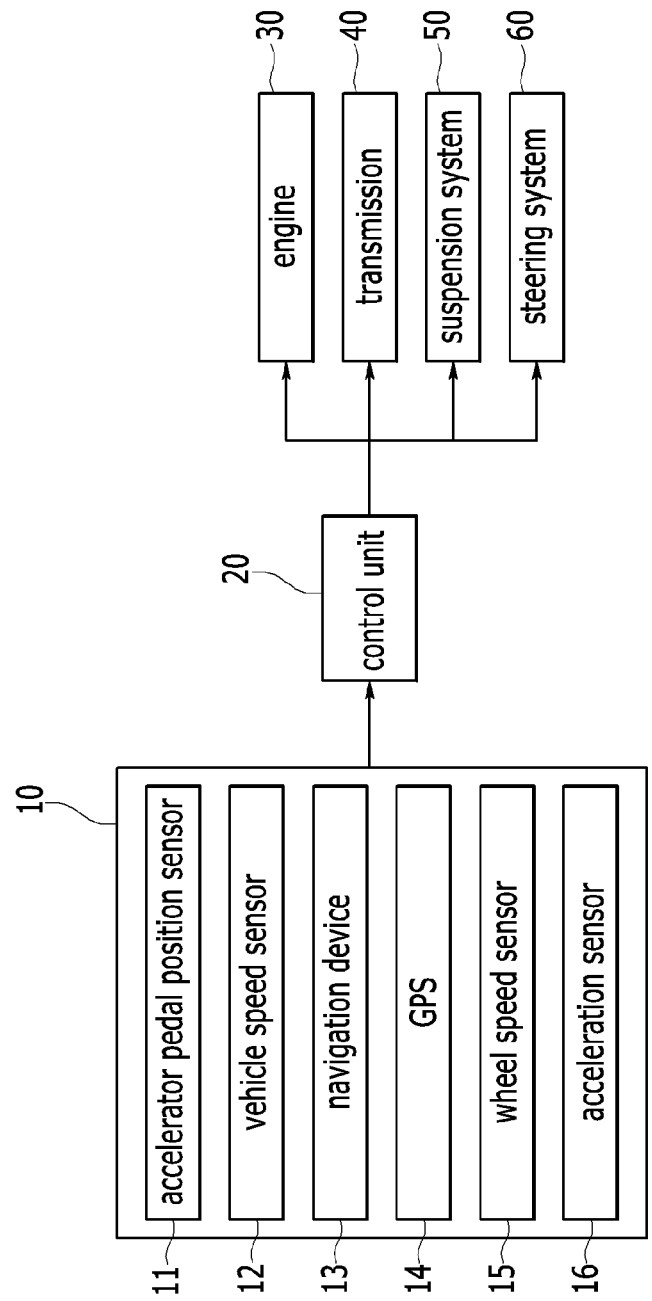
FIG. 1 is an exemplary block diagram of a system of controlling a vehicle according to an exemplary embodiment of the present invention.

FIG. 1 is an exemplary block diagram of a system of controlling a vehicle according to an exemplary embodiment of the present invention. As shown in FIG. 1, a system of controlling a vehicle according to an exemplary embodiment of the present invention may include a data detector 10, a controller 20, an engine 30, a transmission 40, a suspension system 50 and a steering system 60. The controller 20 may be configured to operate the data detector 10, the engine 30, the transmission 40, the suspension system 50, and the steering system 60.

The data detector 10 may be configured to detect data for calculating a driving tendency index of a driver and a turning degree, and the data detected by the data detector 10 may be transmitted to the controller 20. The data detector 10 may include an accelerator pedal position sensor 11, a vehicle speed sensor 12, a navigation device 13, a global positioning system (GPS) 14, wheel speed sensors 15 and an acceleration sensor 16. The accelerator pedal position sensor 11 may further be configured to detect a degree with which a driver engages an accelerator pedal, that is, an engagement degree of the accelerator pedal. In other words, the accelerator pedal position sensor 11 may be configured to detect the data related to driver acceleration intention. The vehicle speed sensor 12 may be configured to detect a vehicle speed and may be mounted at a wheel or a transmission of the vehicle. Additionally, the vehicle speed may be calculated based on a GPS signal received by the GPS 14.

Meanwhile, a target shift-speed may be calculated using a shift pattern based on the signal of the accelerator pedal position sensor 11 and the signal of the vehicle speed sensor 12, and the shift to the target shift-speed may be adjusted. In other words, hydraulic pressure supplied to a plurality of friction elements or released from the plurality of friction elements may be adjusted in an automatic transmission having a plurality of planetary gear sets and the plurality of friction elements. In addition, current applied to a plurality of synchronizer devices and actuators may be adjusted in a double clutch transmission.

The navigation device 13 is a device configured to inform the driver of a route toward a destination. The navigation device 13 may include an input/output portion configured to receive or output information for guidance of the route, a current position detecting portion configured to detect information regarding a current position of the vehicle, a memory in which a map data for calculating the route and a data for guiding the route may be stored, and a control portion configured to search the route and performing guidance of the route. According to the exemplary embodiment of the present invention, however, it may be sufficient for the navigation device 13 to provide the controller 20 with information regarding a shape of a road such as a gradient of the road, a curvature radius of the road, and so on. Therefore, it may be understood that the navigation device 13 in this specification and claims may include any device configured to provide the information regarding the shape of the road to the controller 20.

The GPS 14 may be configured to receive a signal transmitted from a GPS satellite and transmit a signal that corresponds thereto to the navigation device 13. The wheel speed sensors 15 may be mounted at wheels of the vehicle and detect rotation speed of each wheel. An ABS sensor typically mounted at the wheel of the vehicle may be used as the wheel speed sensor 15. The acceleration sensor 16 may be configured to detect an acceleration of the vehicle including a lateral acceleration.

The controller 20 may be configured to calculate a driving tendency index of the driver based on the data detected by the data detector 10 (e.g., a position of the accelerator pedal, a change rate of the position of the accelerator pedal, the vehicle speed, the gradient of the road and so on). In other words, the controller 20 may be configured to calculate the driving tendency index of the driver, for example, during a current driving or for a predetermined time in the current driving. Further, the controller 20 may be configured to calculate the driving tendency index of the driver for a predetermined time (e.g., one month, one year and so on). The driving tendency index of the driver may be determined based on how well one or more assumptions related to the driving tendency of the driver are satisfied, and fuzzy control theory may be used to determine the driving tendency index of the driver. A method of calculating the driving tendency index of the driver is well known in the art. As described in Korean patent application 10-2013-0114692, a method of calculating the driving tendency index is described herein.

A method of determining a short term driving tendency may include: detecting input variables; determining whether determination condition of the short term driving tendency is satisfied; calculating tendencies and output membership function values according to a plurality of fuzzy rules based on the input variables if the determination condition of the short term driving tendency is satisfied; and determining a short term driving tendency index based on the tendencies and the output membership function values according to the plurality of fuzzy rules.

Determination condition of the short term driving tendency may be satisfied if a distance to a preceding vehicle is greater than or equal to a predetermined distance, a curvature radius of an ahead road is greater than or equal to a predetermined curvature radius, a gradient of a road is smaller than or equal to a predetermined gradient, or a road state is not a slippery road, an icy road, a rough road, or an unpaved road. The input variables may include an accelerator pedal position, a change rate of the accelerator pedal position, a vehicle speed and a gradient of a road.

Calculating the tendencies and the output membership function values according to the plurality of fuzzy rules based on the input variables may include calculating a tendency and an output membership function value according to each fuzzy rule. Calculating the tendency and the output membership function value according to each fuzzy rule may include: determining whether the input variables satisfy the corresponding fuzzy rule; selecting a tendency and an output membership function according to the corresponding fuzzy rule if the corresponding fuzzy rule is satisfied; calculating input membership function values according to the input variables included in the corresponding fuzzy rule; calculating a minimum value of the input membership function values; and setting the minimum value as the output membership function value according to the corresponding fuzzy rule. Calculating the tendency and the output membership function value according to each fuzzy rule may further include setting a predetermined tendency and a predetermined value as the tendency and the output membership function value according to the corresponding fuzzy rule if the input variables do not satisfy the corresponding fuzzy rule.

Determining the short term driving tendency index may include: overlapping the plurality of output membership functions on one short term tendency index graph; calculating a mass center of an area occupied by the plurality of output membership function values on the short term tendency index graph; and setting the mass center as the short term driving tendency index.

Four fuzzy rules, three tendencies consisting of mild, normal and sporty and output membership functions according to each tendency may be preset. A first fuzzy rule may be that if the vehicle speed is low, the accelerator pedal position is middle, and the change rate of the accelerator pedal position is middle, the tendency is the normal. A second fuzzy rule may be that if the vehicle speed is low, the accelerator pedal position is middle, and the change rate of the accelerator pedal position is high, the tendency is sporty. A third fuzzy rule may be that if the vehicle speed is high, the accelerator pedal position is high, and the change rate of the accelerator pedal position is high, the tendency is sporty. A fourth fuzzy rule may be that if the accelerator pedal position is middle and the gradient of the road is high, the tendency is normal.

The controller 20 may be configured to calculate a difference between a left wheel speed and a right wheel speed based on the data detected by the data detector 10 (e.g., rotation speed of each wheel). In other words, the controller 20 may be configured to calculate the difference between the left wheel speed and the right wheel speed using the left wheel speed detected by the wheel speed sensor 15 mounted at a left wheel and the right wheel speed detected by the wheel speed sensor 15 mounted at a right wheel. In addition, the controller 20 may be configured to calculate a turning degree based on the data detected by the data detector 10 (e.g., the lateral acceleration) and the difference between the left wheel speed and the right wheel speed. Herein, the turning degree is an index related to a turning tendency of the driver, and more particularly to the number of consecutive turnings. In addition, the number of consecutive turnings may be defined as the number of turning manipulations occurring consecutively during a predetermined time.

When the driver executes a substantial number of turning manipulation during the predetermined time, the turning degree increases. When the driver executes a minimal number of turning manipulation during the predetermined time, on the contrary, the turning degree decreases. In addition, the number of turnings may be filtered with respect to the road shape to reduce effect of the shape of the road. In other words, turning condition may be strictly applied when the curvature radius of the road is minimal (e.g., less than a predetermined curvature radius), but turning condition may be generously applied when the curvature radius of the road is substantial (e.g., greater than a predetermined curvature radius). However, the number of turnings may not be filtered with respect to the road shape. In other words, the same turning condition irrelevant to the shape of the road may be applied. In addition, it may be determined but is not limited that the turning manipulation is executed when the difference between the left wheel speed and the right wheel speed is greater than a predetermined value and an absolute value of the lateral acceleration is greater than a turning determination acceleration.

The controller 20 may be configured to operate the transmission 30, the engine 40, the suspension system 50 and/or the steering system 60 based on the driving tendency index and the turning degree. In other words, the controller 20 may be configured to change a shift pattern, engaging feeling to the target shift-speed, an engine torque map and/or an engine torque filter and may also be configured to change steering force and damping force based on the driving tendency index and the turning degree. For these purposes, the controller 20 may be realized by one or more processors activated by a predetermined program, and the predetermined program may be programmed to perform each step of a method of controlling a vehicle according to an exemplary embodiment of the present invention.

Figure 2:
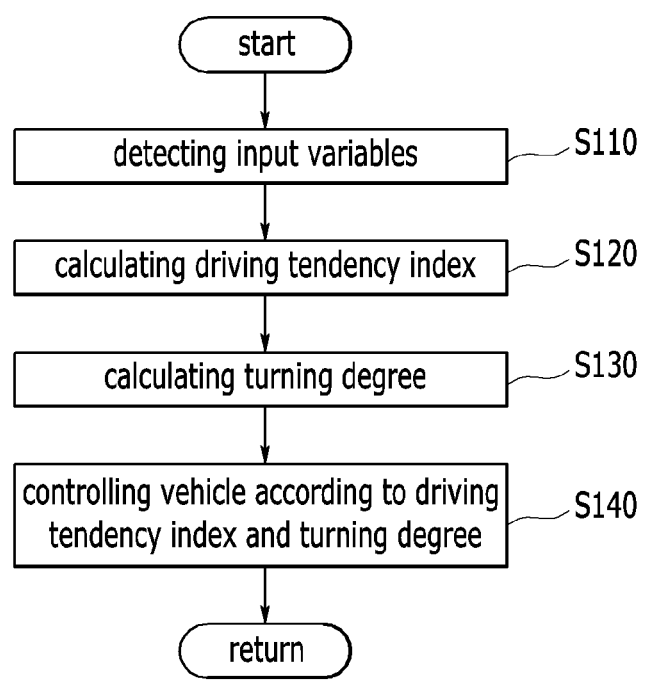
FIG. 2 is an exemplary flowchart of a method of controlling a vehicle according to an exemplary embodiment of the present invention.

Referring to FIG. 2, a method of controlling a vehicle according to an exemplary embodiment of the present invention will hereinafter be described in detail. FIG. 2 is an exemplary flowchart of a method of controlling a vehicle according to an exemplary embodiment of the present invention. As shown in FIG. 2, the method of controlling a vehicle according to the exemplary embodiment of the present invention begins with detecting the input variables at step S110.

When the data detector 10 detects and transmits the data to the controller 20, the controller 20 may be configured to calculate the driving tendency index based on the driving input variable at step S120. In addition, the driving input variable may include the position of the accelerator pedal, the change rate of the position of the accelerator pedal, the vehicle speed and the gradient of the road, but is not limited thereto. In addition, the controller 20 may be configured to calculate the turning degree based on the turning input variable at step S130. Herein, the turning input variable may include the difference between the left wheel speed and the right wheel speed and the lateral acceleration, but is not limited thereto.

Figure 3:
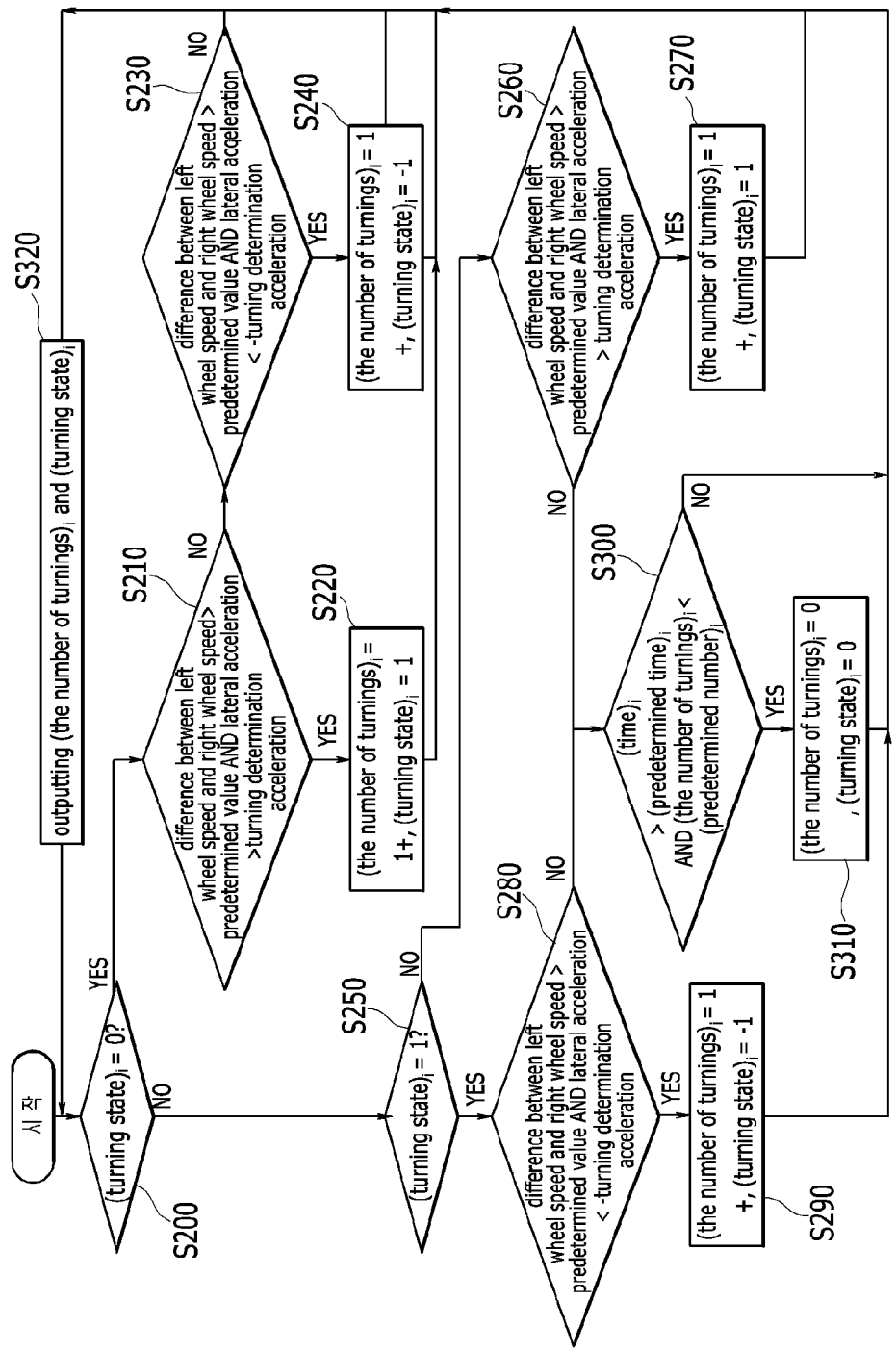
FIG. 3 is an exemplary flowchart of detecting the number of turnings and a turning state according to an exemplary embodiment of the present invention.

Referring to FIG. 3, a method of detecting the number of turnings and a turning state will hereinafter be described in detail. FIG. 3 is an exemplary flowchart of detecting the number of turnings and a turning state according to an exemplary embodiment of the present invention.

As shown in FIG. 3, the controller 20 may be configured to determine whether the turning state is 0 at step S200. Subscript i in FIG. 3 and FIG. 4 refers to the turning degree. In the exemplary embodiment of the present invention, the turning degree may be classified into n phases. In addition, the method of calculating the turning degree in the present exemplary embodiment may be performed by determining whether the turning tendency of the driver satisfies each turning degree and selecting a maximum value of the turning degrees that the turning tendency of the driver satisfies. In addition, when the turning state is 0 refers to the vehicle not turning (e.g., driving substantially straight), when the turning state is 1 refers to, for example, the vehicle turning to the left, and when the turning state is −1 refers to, for example, the vehicle turning to the right. However, the meanings of the turning states are not limited thereto.

When the turning state is 0 at the step S200, the controller 20 may be configured to determine whether turning manipulation occurs to turn the vehicle to the left at step S210. Herein, it may be determined that the turning manipulation for turning the vehicle to the left occurs when the difference between the left wheel speed and the right wheel speed is greater than the predetermined value and the lateral acceleration is greater than the turning determination acceleration. When the turning manipulation occurs to turn the vehicle to the left at the step S210, the controller 20 may be configured to increase the number of turnings by 1 and set the turning state to 1 at step S220. After that, the controller 20 may be configured to output the number of turns and the turning state at the step S320, and return to the step S200.

When the turning manipulation does not occur to turn the vehicle to the left at the step S210, the controller 20 may be configured to determine whether turning manipulation occurs to turn the vehicle to the right at step S230. Herein, it may be determined that the turning manipulation for turning the vehicle to the right occurs when the difference between the left wheel speed and the right wheel speed is greater than the predetermined value and the lateral acceleration is less than the minus (−) turning determination acceleration. In addition, the '−' sign is used to represent a turning direction. When the turning manipulation occurs to turn the vehicle to the right at the step S230, the controller 20 may be configured to increase the number of turnings by 1 and set the turning state to −1 at step S240. After that, the controller 20 may be configured to output the number of turns and the turning state at the step S320, and return to the step S200. When the turning manipulation does not occur to turn the vehicle to the right at the step S230, the controller 20 may be configured to output the previous number of turns and the previous turning state at the step S320, and return to the step S200.

In the meantime, when the turning state is not 0 at the step S200, the controller 20 may be configured to determine whether the turning state is 1 at step S250. When the turning state is not 1 at the step S250, the controller 20 may also be configured to determine whether the turning manipulation occurs to turn the vehicle to the left at step S260. When the turning manipulation does not occur to turn the vehicle to the left at the step S260, the controller 20 may be configured to increase the number of turnings by 1 and set the turning state to 1 at step S270. After that, the controller 20 may be configured to output the number of turns and the turning state at the step S320, and return to the step S200.

In addition, when the turning state is 1 at the step S250, the controller 20 may be configured to determine whether turning manipulation occurs to turn the vehicle to the right at step S280. When the turning manipulation occurs to turn the vehicle to the right at the step S280, the controller 20 may be configured to increase the number of turns by 1 and set the turning state to −1 at step S290. After that, the controller 20 may be configured to output the number of turns and the turning state at the step S320 and return to the step S200. When the turning manipulation does not occur to turn the vehicle to the left at the step S260 or the turning manipulation does not occur to turn the vehicle to the right at the step S280, the controller 20 may be configured to determine whether a time where the turning manipulation does not occur is greater than a predetermined time and the number of turnings is less than a predetermined number at step S300.

When the time where the turning manipulation does not occur is greater than the predetermined time and the number of turnings is less than the predetermined number at the step S300, the controller 20 may be configured to set the number of turnings to 0 and et the turning state to 0 at step S310. After that, the controller 20 may be configured to output the number of turnings and the turning state at the step S320 and return to the step S200. When the time where the turning manipulation does not occur is less than or equal to the predetermined time or the number of turnings is greater than or equal to the predetermined number at the step S300, the controller 20 may be configured to output the previous number of turns and the previous turning state at step S320 and return to the step S200. The i-th number of turns and the i-th turning state may be detected by repeating the method illustrated in FIG. 3.

Figure 4:
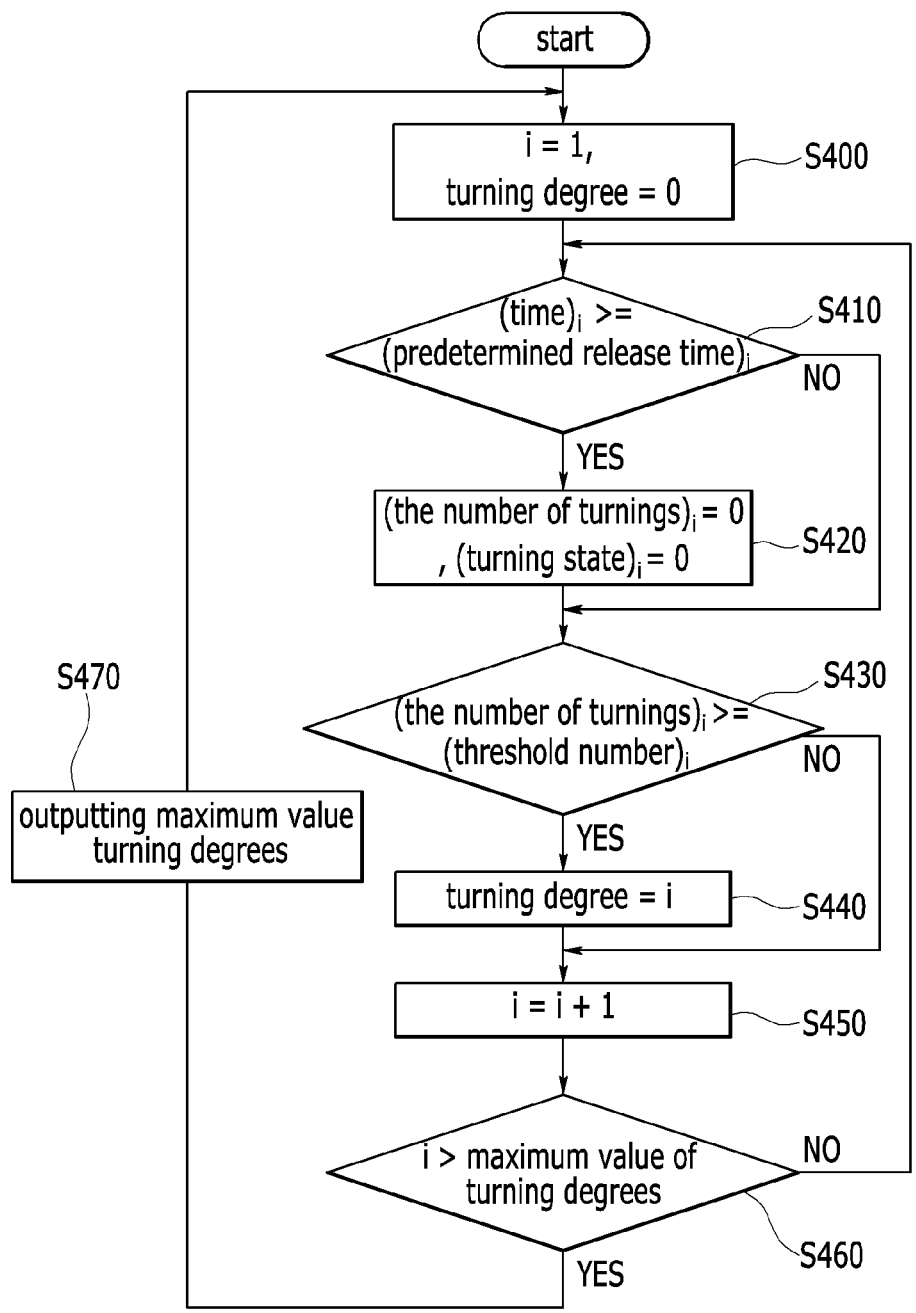
FIG. 4 is an exemplary flowchart of calculating a turning degree according to an exemplary embodiment of the present invention.

Referring to FIG. 4, a method of calculating a turning degree will be described in detail. FIG. 4 is an exemplary flowchart of calculating a turning degree according to an exemplary embodiment of the present invention.

As shown in FIG. 4, the method of calculating the turning degree begins with step S400. In other words, the controller 200 may be configured to substitute 1 for i and set the turning degree to 0 at step S400. In addition, it may be determined at step S410 whether the time where the turning manipulation does not occur is greater than or equal to a predetermined release time. When the time where the turning manipulation does not occur is greater than or equal to the predetermined release time at the step S410, the controller 20 may be configured to set the number of turns to 0 and set the turning state to 0 at step S420. In particular, the turning degree may be 0. Therefore, the vehicle may be operated based on a driving tendency of the driver.

When the time where the turning manipulation does not occur is less than the predetermined release time at the step S410, the controller 20 may proceed to step S430. The controller 20 may be configured to read the i-th number of turns and the i-th turning state detected through the method illustrated in FIG. 3. The controller 20 may be configured to repetitively perform the method illustrated in FIG. 3 to detect a maximum value of the i-th number of turns and use the maximum value of the i-th number of turns as the i-th number of turns at the step S430.

The controller 20 may be configured to determine whether the i-th number of turnings is greater than or equal to a threshold number set at the i-th turning degree at the step S430. When the i-th number of turnings is greater than or equal to the threshold number set at the i-th turning degree at the step S430, the controller 20 may be configured to set the turning degree to i at step S440 and proceed to step S450. When the i-th number of turnings is less than the threshold number set at the i-th turning degree at the step S430, the controller 20 may proceed to the step S450.

After that, the controller may increase i by 1 at the step S450 and determine whether i is greater than a maximum value of the turning degrees at step S460. When i is greater than the maximum value of the turning degrees at the step S460, the controller 20 may be configured to output the maximum value of the turning degrees (in this case, the maximum value of the turning degrees is the turning degree set at the step S440) at step S470 and return to the step S400. When i is less than or equal to the maximum value of the turning degrees at the step S460, the controller 20 may return to the step S410 and may be configured to determine whether turning tendency of the driver corresponds to a next turning degree. The method illustrated in FIG. 4 can be repeated while an ignition key is on.

Referring to FIG. 2 again, when the turning degree is calculated at the step S130, the controller 20 may be configured to operate the vehicle based on the driving tendency index and the turning degree at step S140. In other words, the controller 20 may be configured to change the shift pattern, engaging feeling to the target shift-speed, the engine torque map and/or the engine torque filter and change steering force and damping force based on the driving tendency index and the turning degree. Further, the controller 20 may be configured to operate the vehicle based on the driving tendency index when the driving tendency index is less than or equal to a predetermined index, and operate the vehicle based on the driving tendency index and the turning degree when the driving tendency index is greater than the predetermined index.

In one exemplary embodiment, when the driving tendency index is less than or equal to the predetermined index, the target shift-speed may be calculated by substituting an actual position of the accelerator pedal into the shift pattern when adjusting the shift. When the driving tendency index is greater than the predetermined index, the target shift-speed may be calculated by substituting summation of the actual position of the accelerator pedal and a virtual position of the accelerator pedal obtained from a predetermined map based on the turning degree, the lateral acceleration and the vehicle speed into the shift pattern.

In another exemplary embodiment, the controller 20 may be configured to operate the suspension system 50 and/or the steering system 60 to output predetermined damping force and/or predetermined steering force when the driving tendency index is less than or equal to the predetermined index. Further, the controller 20 may be configured to adjust the predetermined damping force and/or the predetermined steering force based on the driving tendency index and/or the turning degree when the driving tendency index is greater than the predetermined index.

As described above, driver intention may be more precisely reflected regarding the shift and driving stability may be improved by operating the vehicle based on the driving tendency and the turning tendency of the driver according to the exemplary embodiment of the present invention.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method of controlling a vehicle, comprising:
   detecting, by a controller, input variables including a driving input variable and a turning input variable;
   calculating, by the controller, a driving tendency index based on the driving input variable;
   calculating, by the controller, a turning degree related to the number of consecutive turnings based on the turning input variable, wherein the turning input variable includes a difference between a left wheel speed and a right wheel speed and a lateral acceleration; and
   operating, by the controller, the vehicle based on the driving tendency index and the turning degree.

2. The method of claim 1, wherein the driving input variable includes a position of an accelerator pedal, a change rate of the position of the accelerator pedal, a vehicle speed, and a gradient of a road.

3. The method of claim 1, wherein the operating of the vehicle includes operating at least one selected from the group consisting of: an engine, a transmission, a suspension system, and steering system.

4. The method of claim 1, wherein the number of consecutive turnings is defined as the number of turning manipulations occurring consecutively during a predetermined time.

5. The method of claim 4, wherein occurrence of the turning manipulation is determined when a difference between the left wheel speed and the right wheel speed is greater than a predetermined value and an absolute value of the lateral acceleration is greater than a turning determination acceleration.

6. The method of claim 1, wherein the turning degree is a maximum value of the turning degrees in which the number of consecutive turnings is greater than or equal to a threshold number that is set at each turning degree.

7. The method of claim 1, wherein the operating of the vehicle is performed based on the driving tendency index when the driving tendency index is less than or equal to a predetermined index, and based on the driving tendency index and the turning degree when the driving tendency index is greater than the predetermined index.

8. A system of controlling a vehicle, comprising:
an accelerator pedal position sensor configured to detect a position of an accelerator pedal;
a vehicle speed sensor configured to detect a vehicle speed;
a navigation device configured to supply road information including a gradient of a road;
wheel speed sensors mounted at wheels of the vehicle and configured to detect speed of each wheel;
an acceleration sensor configured to detect an acceleration of the vehicle including a lateral acceleration; and
a controller configured to:
receive input variables including a driving input variable and a turning input variable from the accelerator pedal position sensor, the vehicle speed sensor, the navigation device, the wheel speed sensor and acceleration sensor;
calculate a driving tendency index based on the driving input variable;
calculate a turning degree related to the number of consecutive turnings based on the turning input variable, wherein the turning input variable includes a difference between a left wheel speed and a right wheel speed and the lateral acceleration; and
operate the vehicle based on the driving tendency index and the turning degree.

9. The system of claim 8, wherein the driving input variable includes a position of an accelerator pedal, a change rate of the position of the accelerator pedal, a vehicle speed, and the gradient of the road.

10. The system of claim 8, wherein the controller is configured to operate at least one selected from the group consisting of: an engine, a transmission, a suspension system, and a steering system.

11. The system of claim 8, wherein the number of consecutive turnings is defined as the number of turning manipulations occurring consecutively during a predetermined time.

12. The system of claim 11, wherein occurrence of the turning manipulation is determined when a difference between the left wheel speed and the right wheel speed is greater than a predetermined value and an absolute value of the lateral acceleration is greater than a turning determination acceleration.

13. The system of claim 8, wherein the turning degree is a maximum value of the turning degrees in which the number of consecutive turnings is greater than or equal to a threshold number that is set at each turning degree.

14. The system of claim 8, wherein the controller is configured to operate the vehicle based on the driving tendency index when the driving tendency index is less than or equal to a predetermined index, and based on the driving tendency index and the turning degree when the driving tendency index is greater than the predetermined index.

15. A non-transitory computer readable medium containing program instructions executed by a controller, the computer readable medium comprising:
program instructions that detect input variables including a driving input variable and a turning input variable;
program instructions that calculate a driving tendency index based on the driving input variable;
program instructions that calculate a turning degree related to the number of consecutive turnings based on the turning input variable, wherein the turning input variable includes a difference between a left wheel speed and a right wheel speed and a lateral acceleration; and
program instructions that operate the vehicle based on the driving tendency index and the turning degree.

16. The non-transitory computer readable medium of claim 15, wherein the driving input variable includes a position of an accelerator pedal, a change rate of the position of the accelerator pedal, a vehicle speed, and a gradient of a road.

* * * * *